United States Patent
Hildebrand et al.

(10) Patent No.: US 7,541,689 B2
(45) Date of Patent: Jun. 2, 2009

(54) DEVICE FOR STARTING THE ENGINE OF A MOTOR VEHICLE

(75) Inventors: Gert Hildebrand, Munich (DE); Ulrike Schafmeister, Munich (DE); Marc Girard, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/516,602

(22) Filed: Sep. 7, 2006

(65) Prior Publication Data
US 2007/0056792 A1 Mar. 15, 2007

(30) Foreign Application Priority Data
Sep. 9, 2005 (DE) .................. 10 2005 043 232

(51) Int. Cl.
*B60R 25/04* (2006.01)
(52) U.S. Cl. ........................ 307/10.6; 307/9.1
(58) Field of Classification Search ............... 307/9.1, 307/10.6
See application file for complete search history.

(56) References Cited

U.S. PATENT DOCUMENTS

| 7,270,623 | B2 * | 9/2007 | Wang ..................... 477/96 |
| 7,290,416 | B2 * | 11/2007 | Ohtaki et al. ................ 70/252 |
| 7,355,299 | B2 * | 4/2008 | Ghabra et al. ............ 307/10.3 |

FOREIGN PATENT DOCUMENTS

| DE | 295 09 741 U1 | 10/1995 |
| DE | 198 36 968 C2 | 2/2000 |
| DE | 199 17 817 A1 | 10/2000 |
| DE | 199 39 733 C2 | 3/2001 |
| DE | 199 43 999 C2 | 4/2001 |
| DE | 102 43 318 A1 | 4/2004 |
| DE | 103 03 011 A1 | 8/2004 |
| DE | 103 53 195 A1 | 8/2004 |
| DE | 103 59 013 A1 | 7/2005 |
| DE | 10 2004 018 164 A1 | 11/2005 |
| DE | 10 2004 023 939 A1 | 12/2005 |
| DE | 10 2004 019 919 B3 | 2/2006 |
| DE | 10 2005 037 440 A1 | 2/2006 |
| EP | 1 279 576 A2 | 1/2003 |
| EP | 1 361 324 A2 | 11/2003 |
| EP | 1 279 576 B1 | 3/2006 |
| WO | WO 95/09748 A1 | 4/1995 |

OTHER PUBLICATIONS

European Search Report dated Dec. 28, 2006 including a partial English translation of the relevant portion (Eight (8) pages).
German Search Report dated Jun. 1, 2006 including English translation of pertinent portion (Nine (9) pages).

* cited by examiner

*Primary Examiner*—Stephen W Jackson
*Assistant Examiner*—Adi Amrany
(74) *Attorney, Agent, or Firm*—Crowell & Moring LLP (57) ABSTRACT

A device and method are provided for starting the engine of a motor vehicle equipped with an authentification device, which includes an access entitlement unit that the user can carry and a vehicle-side access entitlement test device having a receptacle for the access entitlement unit, and with a tripping unit, which includes a tripping element that when activated can initiate an engine start. The tripping element and the receptacle are connected mechanically together such that the tripping element is actuatable by an essentially translatory movement of the access entitlement unit inserted into the receptacle.

13 Claims, 4 Drawing Sheets

DEVICE FOR STARTING THE ENGINE OF A MOTOR VEHICLE

BACKGROUND AND SUMMARY OF THE INVENTION

This application claims the priority of German Application No. 10 2005 043 232.8, filed Sep. 9, 2005, the disclosure of which is expressly incorporated by reference herein.

The present invention relates to a device for starting the engine of a motor vehicle with an authentification device, which includes an access entitlement device that the user can carry and a vehicle-side access entitlement test device with a receptacle for the access entitlement unit, and with a tripping unit including a tripping element, which when activated can initiate an engine start.

Such devices are used in a variety of modern motor vehicles. Therefore, there is no need for a conventional ignition key. For the access entitlement test, the access entitlement unit is usually, for example, first inserted into the receptacle of the access entitlement test device. Then, upon actuating the tripping element, the engine start is initiated. The tripping unit (or at least the tripping element) is, as a rule, spatially separated from this receptacle in the motor vehicle. This separation necessitates, first of all, a separate cabling for both the receptacle and also the tripping element. Secondly, the operator cannot insert the access entitlement unit into its destination position in one continuous sequence of movements; neither can he actuate the tripping element in one continuous sequence of movements.

An attempt to avoid these drawbacks is known from DE 103 59 013 A1. The teaching of DE 103 59 013 A1 focuses predominantly on dispensing with a separate vehicle-sided tripping element and the associated simplified cabling in a motor vehicle. Instead of a separate vehicle-sided tripping element, DE 103 59 013 A1 proposes that a tripping element be provided on the access entitlement unit or that an engine start be initiated by a suitable positioning of the access entitlement unit.

However, such a device and/or its operation are not regarded as advantageous and desirable by every operator. Such a viewpoint is based on a number of reasons, which shall be explained below.

An engine start, which is initiated merely by suitably positioning the access entitlement unit and does not require, for example, a dedicated operating action, may be inadvertently initiated and/or may surprise a novice operator. In the worst case, an inadvertently initiated or surprising engine start may result in damage to the motor vehicle and/or the environment of the motor vehicle—in addition to an unpleasant surprise for the operator and perhaps other occupants of the vehicle. Moreover, many users appreciate the necessity of a dedicated operating action for starting the engine, for example, because the operation of the vehicle is, thus, better controlled by the operator and the reactions of the vehicle remain understandable to the operator.

The design of a tripping element, according to DE 103 59 013 A1, which is provided directly on an access entitlement unit, is severely limited, as a rule, owing to the limited construction space and the limited supply of energy to the access entitlement unit that the user may carry. For example, such a tripping element may have only very small dimensions. In addition, shape features may not be adequately considered. Such features usually serve to give the operator, upon actuating the tripping element, a pleasant haptic feeling and a high-quality impression of the vehicle that is ultimately linked either consciously or unconsciously to this haptic feeling. Such construction features include, for example, the travel distance and the mechanical resistance on actuating a tripping element.

The object of the present invention is to provide a device for starting the engine of a motor vehicle that is characterized by an improved manipulability.

This problem is solved by a device for starting the engine of a motor vehicle with an authentification device, which comprises an access entitlement device that the user can carry and a vehicle-sided access entitlement test device with a receptacle for the access entitlement unit, and with a tripping unit, which comprises a tripping element, which when activated can initiate an engine start, wherein the tripping element and the receptacle are connected mechanically together in such a manner that the tripping element is actuatable by moving in essence translatorically the access entitlement unit, inserted into the receptacle. Alternatives, advantageous embodiments, and further developments of the invention are described and claimed herein.

According to the invention, the tripping element and the receptacle are connected mechanically together in such a manner that the tripping element can be actuated by moving, in essence, translatorically the access entitlement unit, inserted into the receptacle.

Therefore, the operator may insert the access entitlement unit into the receptacle in one continuous sequence of movements, and then actuate the tripping element by depressing and/or pushing, for example, against the access entitlement unit with one or several fingers, thus displacing, in essence, said access entitlement unit translatorically. If the access entitlement unit and its receptacle are constructed correspondingly, precisely the translatoric displacement of the access entitlement unit (in the simplest case "depressing" said access entitlement unit) appears to the operator as a continuous continuation of the preceding insertion of the access entitlement unit into the receptacle. In contrast, the necessity of turning, as in the case, for example, of a conventional ignition key and/or ignition lock, would interrupt the continuous sequence of movements after insertion of the access entitlement unit into the receptacle.

An advantage of the invention lies in the fact that such a continuous sequence of movements is made possible. However, the operator also has the option of interrupting the sequence of movements between the insertion of the access entitlement unit into the receptacle and the translatoric displacement. In addition, the targeted technical additional measures may automatically cause at least a brief interruption and, thus, avoid an inadvertent engine start.

Preferably, the translatoric displacement of the access entitlement unit for actuating the tripping element is carried out in essence in the direction in which the access entitlement unit was inserted previously into the receptacle. The sequence of movements required for both steps appears to the operator as especially continuous and, hence, is perceived as being easy to perform.

According to a preferred embodiment of the present invention, the receptacle for the access entitlement unit is attached to the tripping element such that the sole requirement is to manipulate the access entitlement unit, with the access entitlement unit inserted into the receptacle, in order to actuate the tripping element. The concept "manipulation of an object" is defined within the meaning of the invention as touching the object and/or the direct application of force and/or torque to the object. Therefore, apart from the access entitlement unit, the operator does not have to touch or actuate in any manner whatsoever any other components.

For example, the tripping element may be constructed as the bottom of an operating element, in particular as a push button. Then, the access entitlement unit may be affixed in such a manner to the tripping element, for example, by a magnetic connection or a detachable snap connection, and may be constructed such that it is suitable to act as the top of the operating element. Then, the operator may mount the top on the bottom and initiate the engine start by actuating the operating element, comprising the top and the bottom. The actuation of the assembled operating element automatically actuates the tripping element. During the actuating operation the operator generally manipulates (i.e., touches) merely the top of the operating element, thus the access entitlement unit, to which then direct force and/or torque is applied.

Therefore, the access entitlement unit itself may represent an essential component of a push button that is depressed in order to actuate the tripping element. This essential component of the push button may be initially absent from the tripping unit, is then added in the form of an access entitlement unit, and finally depressed for the purpose of actuating the tripping element.

The operator has a number of options for operating such a device. After inserting the access entitlement unit into the receptacle, he may continue to retain in his grip in an especially advantageous manner the access entitlement unit, for example, between his thumb and his index finger, and then actuate the tripping element as a continuation of a continuous movement. Therefore, following insertion of the access entitlement unit into its receptacle, it is not necessary for the operator to release his grip of the access entitlement unit in order to initiate the engine start.

As an alternative, however, the operator may also insert first the access entitlement unit into its receptacle on the tripping element, with the result that a new operating element, composed of the access entitlement unit and the tripping element, is produced; and then the operator may consciously interrupt or suspend his movement. Then, the operator may initiate the engine start at a later time by actuating the operating element, composed of the access entitlement unit and the tripping element.

In the present invention the cabling complexity may be minimized, because, for example, the tripping element and the receptacle, attached to the tripping element, may be constructed such that both can be connected to a wiring harness of the motor vehicle via a single multiple wire cable joint.

Since the tripping element is provided on the vehicle side, the vehicle developer has, in principle, wide freedom of discretion in shaping the operating elements, known from the prior art, for the purpose of designing the tripping element. For an advantageous implementation of the present invention one must also take into consideration that the access entitlement unit should be attachable to the tripping element with sufficient rigidity, because the actuation of the tripping element is to be carried out by manipulating the access entitlement unit; and the mechanical pressure, which is thus generated, must be transferred to the tripping element in order to actuate the same.

Structural freedom, which is obtained and/or gained, according to the invention, makes it possible, for example, to give the operator, upon actuating the tripping element or rather the operating unit, (composed of the access entitlement unit and the tripping element), a pleasant haptic feeling and an impression of a high-quality vehicle that is ultimately linked either consciously or unconsciously to this haptic feeling. In addition, for example, the travel distance and the mechanical resistance on actuating a tripping element, constructed as a push button, may be dimensioned in a suitable manner, according to the methods known from the prior art.

The actuation of the tripping element is carried out, according to such embodiments of the present invention, preferably against a mechanical resistance. The concept of "a mechanical resistance" is also and particularly defined as a mechanical resistance that may vary over the actuating time and/or the travel distance. Even an active haptic feedback to the operator may be realized by means of the methods, known to this end from the prior art, as a further development of the invention.

Preferably, the inventive device exhibits measures for detecting the presence of the access entitlement unit in the receptacle. Such measures are provided on the vehicle side, in particular in the vehicle-side access entitlement test device and/or in the access entitlement unit. The fact that the access entitlement unit was inserted into the receptacle can be detected by the motor vehicle and, if desired, by its data-processing components.

Preferably, the presence of the access entitlement unit in the receptacle of the access entitlement test device and/or the vehicle-side detection of this presence may initiate an access entitlement test. Such an access entitlement test may be carried out by methods that are well-known. Owing to a successfully completed access entitlement test, a state transition may be initiated on the vehicle side. For example, an ignition voltage may be applied to a vehicle terminal; and/or a lighting effect may be initiated; and/or information may be issued to the operator.

As an alternative, such an access entitlement test may also be carried out already beforehand in a manner that is also well-known, for example, by so-called "keyless go" systems. However, then the insertion of the access entitlement unit into the receptacle of the access entitlement test device may also initiate an additional access entitlement test. Even upon successful completion of this second access entitlement test, a state transition may be initiated on the vehicle side.

As an alternative or in addition, the insertion of the access entitlement unit into the receptacle of the access entitlement test device may initiate a vehicle-side state transition, if desired, even an engine start, without actually testing the access entitlement. Even though then an access entitlement is not necessarily tested, this case, too, may be subsumed under the concepts used in the claims: "authentification device," "access entitlement unit," and "access entitlement test device" in favor of a succinct and apt expression.

To detect the presence of the access entitlement unit in the receptacle, the access entitlement unit and the receptacle may be constructed in such a manner, for example, that owing to the presence of the access entitlement unit in the receptacle, a switch is closed. In this respect, a variety of alternatives are contemplated. For example, the access entitlement unit may include a magnet, the presence of which causes a Reed switch to be closed; and/or the access entitlement unit may exhibit a surface, some of which at least conducts electricity and by which a contact is closed when the access entitlement unit is inserted into the receptacle.

A vehicle-sided state transition, which is initiated via insertion of the access entitlement unit into the receptacle, may consist of releasing the tripping element especially in view of the actual ability to initiate an engine start. Preferably, an engine start can be initiated only by actuating the tripping element, when the access entitlement unit is inserted into the receptacle and, if desired, a corresponding access entitlement test has been successfully completed.

Preferably, the receptacle exhibits a recess, into which the access entitlement unit is first slid or placed and then, to initiate the engine start, is slid and/or inserted even further.

The recess may be constructed, for example, in the shape of a trough. Then, a substantially oval or spherically-shaped access entitlement unit may be placed in an especially simple manner by the operator into the corresponding—for example, semi-oval or semi-spherically shaped—trough. In a substantially horizontal configuration of the receptacle, for example, in the central console, the access entitlement unit cannot even be rolled or slid out of such a trough.

As an alternative or in addition, the tripping element and the access entitlement unit may be constructed in such a manner that the access entitlement unit is or may be mounted in such a manner on the tripping element that it stays there without the operator continuing to hold it.

According to a first further development of the present invention, the tripping element may be operated only when the access entitlement unit is present in the receptacle; and, if desired, a respective access entitlement test has been successfully completed. To this end, the tripping element may be constructed such that it can be mechanically locked. For the locking operation, for example, either a locking pin may be slid into the tripping element perpendicular to its direction of motion; or a push button, acting as a tripping element, may be constructed with an active force feedback in such a manner and controlled in such a manner that the operator cannot depress the push button (or can depress it only with a large amount of force). Such a locking is maintained preferably as long as the access entitlement unit is not inserted into the receptacle; and, if desired, a corresponding access entitlement test has not been successfully completed.

Such a further development is possible only with the invention, since a lockable tripping element, which is required to this end, calls for a design that requires a lot of equipment and could not be disposed, for example, on an access entitlement unit, which the user can carry and which is disclosed in DE 103 59 013 A1.

According to a second further development of the present invention, the personal data of at least one operator can be stored in the access entitlement unit and can be transferred from the access entitlement unit to the motor vehicle. First of all, this makes it possible to apply all of the methods that are known from the prior art for personalizing and individualizing a motor vehicle by means of an access entitlement unit. Such methods include both the transfer of personal data between several motor vehicles and the generation of personal data, acquired from the motor vehicle, for example, on a home PC and their utilization in the motor vehicle. For example, it is also contemplated to store and/or transfer seat settings, passenger configurations, vehicle configurations, pieces of music, instructional and entertainment programs, such as MP3 players, radio frequencies, telephone numbers, programming of a multifunctional operating system, navigation addresses, mood scenarios, a garage opening function, toll-related data, gasoline bills and/or consumption measurements and the like.

The access entitlement unit may also be constructed such that it is suitable for communicating when a suitable counterpoint is available and for transferring personal data between different types of motor vehicles. In this way the personal data, stored in the access entitlement unit, may also be used by the operator for adapting rental vehicles, second vehicles, third vehicles, etc. Upon access to the respective data, such data may also be used, for example, to invoice/calculate fleet consumption, average consumption and/or performance per kilometer; to prepare an automatic record of trips; to invoice rental vehicles; to program the ideal route; to store addresses; to store so-called scenic tours; to order a replacement vehicle at the car dealer; to analyze customer behavior; to collect shop data and/or to see the total cost of the vehicle.

Secondly, such personal data may be used in an advantageous manner in a special connection with the present invention. For example, the personal data may be used to adapt the mechanical resistance, against which the tripping element is actuated, as a function of the personal data. To this end, the personal data may be transmitted from the access entitlement unit to the tripping unit.

To couple the access entitlement unit to a PC and/or another data-processing and/or configuration unit, an inventive device may comprise a suitable coupling station.

According to a third further development of the present invention, the access entitlement unit exhibits at least one optical display element. Such a display element makes it possible to show information to the operator outside the vehicle when the user carries the access entitlement unit or also in the interior of the vehicle, for example, while operating the vehicle.

Such a display element may be used in an especially advantageous manner, when the vehicle data are transferable from the motor vehicle to the access entitlement unit. The optical display element of the access entitlement unit may then be used to display the vehicle data.

The display element may be used in particular to visualize to the operator the current state of the motor vehicle and/or the access entitlement unit as well as, if desired, information regarding the applicability of the access entitlement unit with respect to the current state.

Preferably, the optical display element is suitable for indicating to the operator the readiness of the motor vehicle to initiate the engine start. For example, after the access entitlement unit has been inserted into its receptacle, the display element may send a graphic, symbolic or textual display that makes it clear to the operator that the motor vehicle is ready to initiate the engine start and, if desired, that gives additional instructions.

For example, in an embodiment of the invention, in which the access entitlement unit and the tripping element form together an assembled operating element, the display "PUSH TO START" may appear after the access entitlement unit has been inserted into its receptacle. This makes it clear to the operator that in the current situation he may initiate an engine start by depressing the access entitlement unit.

While operating the vehicle, the display element of the access entitlement unit may be used to display selected vehicle data, which are usually displayed, according to the prior art, in the instrument cluster or at another site in the motor vehicle. In this way the information density may be equalized in the instrument cluster or at a different site in the motor vehicle.

Thus, the display element of the access entitlement unit may also be used in different phases of the vehicle deployment, especially during the actual operation of the vehicle (e.g., when the engine is running) and also during a preparatory phase (access entitlement unit in receptacle, but tripping element has not been actuated yet) for the purpose of displaying selected vehicle data.

Outside the motor vehicle, the display element may reproduce, for example, time-related information, for example a clock time or the remaining parking entitlement period.

In general it is advantageous—even in embodiments that deviate from the invention—if in a device of the class cited in the introductory part of the specification, the tripping element and the receptacle for the access entitlement unit are disposed on the vehicle side in such a manner that the tripping element can be operated without the operator's hand, which inserts the access entitlement unit into the receptacle, having to regrasp the tripping element. In this context the term "to regrasp" is defined in particular as a complete or partial release, followed up by another grasping motion. If such a regrasping is avoided, an insertion of the access entitlement unit into its destination position and a necessary operating action for initiating the engine start may ensue in one continuous sequence of movements. Therefore, the manipulability of the device for starting the engine is improved, compared to the prior art.

According to a device of the aforementioned class that is contemplated as an alternative to the invention, the tripping element may also be shifted in principle at a non-vanishing distance relative to the receptacle for the access entitlement unit. However, the distance must be kept very small, preferably in the range of a few centimeters; and the direction of the displacement must be selected such that the tripping element can be comfortably operated by an operator, while the operator's hand grasps the access entitlement unit in a way that is appropriate for inserting the access entitlement unit into the receptacle. Preferably, the distance and the direction of the offset is selected such that the operator inserts the access entitlement unit, which is held in essence between the index finger and the thumb, into the receptacle and may easily actuate the tripping element without regrasping, i.e., in the same continuous sequence of movements with the small finger, the ring finger and/or the middle finger of the same hand. In such a device that is contemplated as an alternative, the distance must be selected correspondingly smaller than or equal to the radius of action that remains for the small finger, the ring finger and/or the middle finger of the hand of a conventional operator when said operator holds the access entitlement unit in essence between the index finger and the thumb of the same hand. The decisive factor for establishing the direction of the offset is, in which spatial position the operator normally grasps the access entitlement unit. In the event that the access entitlement unit is grasped normally in an overhand grip, i.e., with the thumb from the bottom and the index finger from the top, while inserting into the receptacle, then from the operator's view the tripping element must be arranged preferably in essence to the right of the receptacle, if desired, slightly offset to the top. In the event that the access entitlement unit is grasped normally in a side grip, i.e., with the thumb from the left and the index finger from the right, then from the operator's view the tripping element must be arranged preferably in essence above, if desired, slightly offset to the right of the receptacle. The above description relates to a design for operating with the right hand of the operator. A design for operating with the left hand of the operator may be constructed so as to be mirror-inverted with analogous considerations. The operator's favored spatial position for grasping the access entitlement unit depends chiefly on the shape of the access entitlement unit and the arrangement of the receptacle in the motor vehicle. Therefore, it can be specifically influenced by these shape characteristics.

Similarly, the dimensions of the distance and the direction of the offset may be the basis for the consideration that the operator holds the access entitlement unit in essence between the middle finger and the thumb of the same hand. Then for the distance between the receptacle and the tripping element the upper limit is the radius of action that remains for the index finger of a hand of a conventional operator, when the operator holds the access entitlement unit in essence between the middle finger and the thumb. Even in the event the access entitlement unit is grasped between the middle finger and the thumb, the decisive factor for establishing the direction of the offset between the receptacle and the tripping element is, in which spatial position the access entitlement unit is normally grasped by the operator. In the event that the access entitlement unit shall be held in an overhand grip, i.e., with the thumb from the bottom and the middle finger from the top, while inserting the access entitlement unit into the receptacle, the tripping element must be arranged from the operator's view preferably in essence to the left of the receptacle, if desired, slightly offset to the top. In the event that the access entitlement unit is normally grasped in a side grip, i.e., with the thumb from the left and the middle finger from the right, the tripping element must be arranged from the operator's view preferably in essence above the receptacle. To insert the access entitlement unit into the receptacle in an underhand grip, i.e., with the thumb from the top and the middle finger from the bottom, the tripping element must be arranged from the operator's view preferably in essence to the right of the receptacle, if desired slightly offset to the bottom. The above description relates in turn to a design for operating with the right hand of the operator. A design for operating with the left hand of the operator may be constructed so as to be mirror-inverted with analogous considerations.

In such a device, which is contemplated as an alternative, the receptacle for the access entitlement unit and the tripping element may be mounted on an operating component that is integrated jointly into an instrument panel or the center console of the motor vehicle. Then the cabling complexity may be minimized. For example, the operating component in such a case may be designed in such a manner that it can be connected to the cable harness of the motor vehicle by means of a single multi-wire cable joint.

Other objects, advantages and novel features of the present invention will become apparent from the following detailed description of the invention when considered in conjunction with the accompanying drawings.

BRIEF DESCRIPTION OF THE DRAWINGS

FIG. 2b is a schematic drawing of a second sectional view of the device of FIG. 2a;

FIG. 2c is a schematic drawing of a third sectional view of the device of FIG. 2a;

DETAILED DESCRIPTION OF THE DRAWINGS

Figure 1:
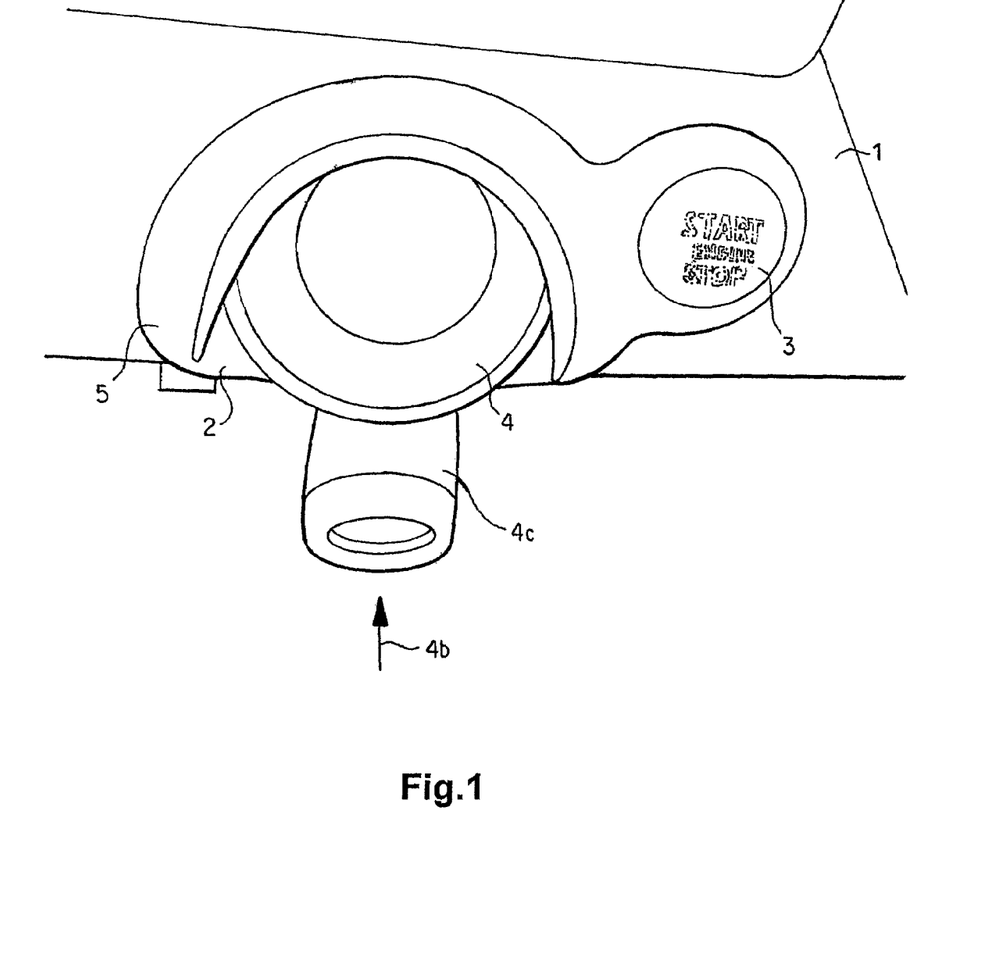
FIG. 1 is a schematic drawing of a perspective view of a device with a tripping element, arranged separately from the receptacle.

First, a device with a tripping element that is arranged separately from the receptacle shall be described. FIG. 1 is a perspective view of the device. The device includes an authentification device and a tripping unit. The authentification device includes, in essence, an access entitlement unit 4, which the user can carry, and a vehicle-side access entitlement test device 5. In the present example, the access entitlement test device 5 is integrated, as the operating component, into an instrument panel 1 of the motor vehicle. The access entitlement test device 5 has a recess 2 for accommodating the access entitlement unit 4. The access entitlement unit 4 may be slid by an operator in the direction of the arrow 4b into the recess 2 and snapped in place there by way of a holding device (not illustrated).

For a simplified grasping of the access entitlement unit 4 and, if desired, for attaching a key chain, an operator may use the extension 4c of the access entitlement unit 4. Furthermore, the continuation 4c may accommodate, at least to some extent, an antenna of the access entitlement unit 4.

As soon as the access entitlement unit 4 is slid into the recess 2 as far as an abutment stop, which the operator can detect, an authentification procedure is started on the vehicle side. In this procedure, an access entitlement code of the access entitlement unit 4 is essentially queried. The access entitlement code is filed in a storage unit (not illustrated) of the access entitlement unit 4.

The tripping unit includes in essence the push button 3, which serves as the tripping element. In addition, the tripping unit includes means for sending a tripping signal to the engine control of the motor vehicle. Following completion and success of the authentification, an engine start can be initiated by operating the push button 3.

In the present example the push button 3 is mounted on the access entitlement test device 5. Therefore, the recess 2 for receiving the access entitlement unit 4 and the push button 3 are mounted on a joint operating component—in this case, the access entitlement test device 5 itself. The electrical connections of the push button 3 are combined with those of the access entitlement test device 5 in a multi-wire connecting plug. The vehicle-sided cabling is correspondingly simple to configure.

Both the recess 2, provided for receiving the access entitlement unit 4, and the push button 3 are disposed on the vehicle side. In particular, the vehicle-side arrangement of the push button 3 makes allowances for the bulk of the push button and provides it with an illuminated display element. In addition, it allows the vehicle-side arrangement of the push button 3 to be constructed in such a manner that in order to operate the button, i.e., to initiate, in fact, the engine start, a travel distance of several millimeters is necessary and that, when the operator operates the button, he experiences a mechanical resistance, which is regarded by the operator—s subjective perception as high-grade. The pressure force, required to operate the push button, varies in the present example as a function of the distance that is already traveled and amounts, at a maximum, to more than 1 N.

The recess 2, provided for receiving the access entitlement unit 4, and the push button 3 are spaced a few centimeters apart from each other, but are arranged adequately close to each other that the operator may slide the access entitlement unit 4 into the recess 2 in one continuous sequence of movements and may operate the push button 3. This action may be done very simply in that for the purpose of insertion the operator grasps the access entitlement unit 4 essentially at the continuation 4c between the middle finger and the thumb of the right hand and then after insertion operates the push button 3 with the index finger of the same hand. To grasp the access entitlement unit 4, the operator uses preferably a so-called underhand grip, during which he places the thumb from the top and the edge of the middle finger, facing the index finger, from the bottom on the access entitlement unit 4.

Figure 2A:
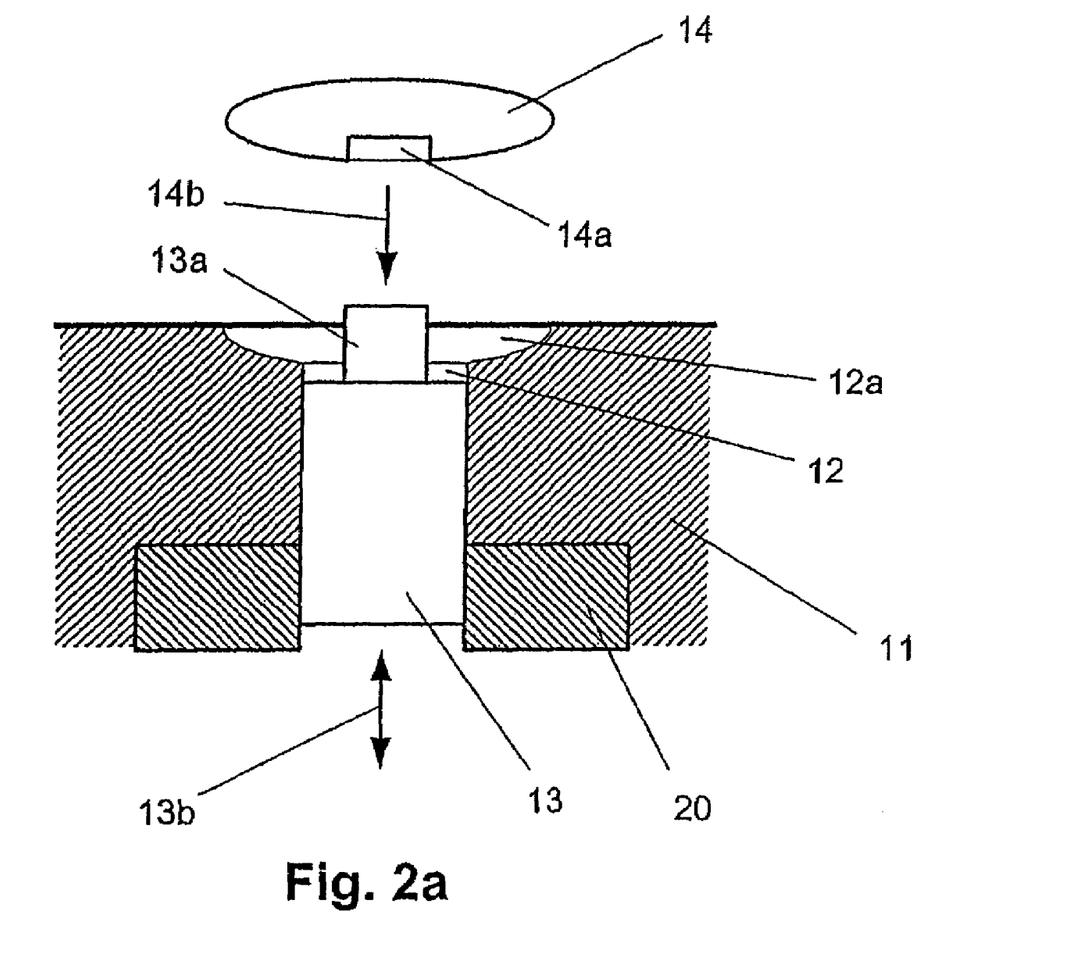
FIG. 2a is a schematic drawing of a first sectional view of a device, according to a preferred embodiment of the present invention.
Figure 2B:
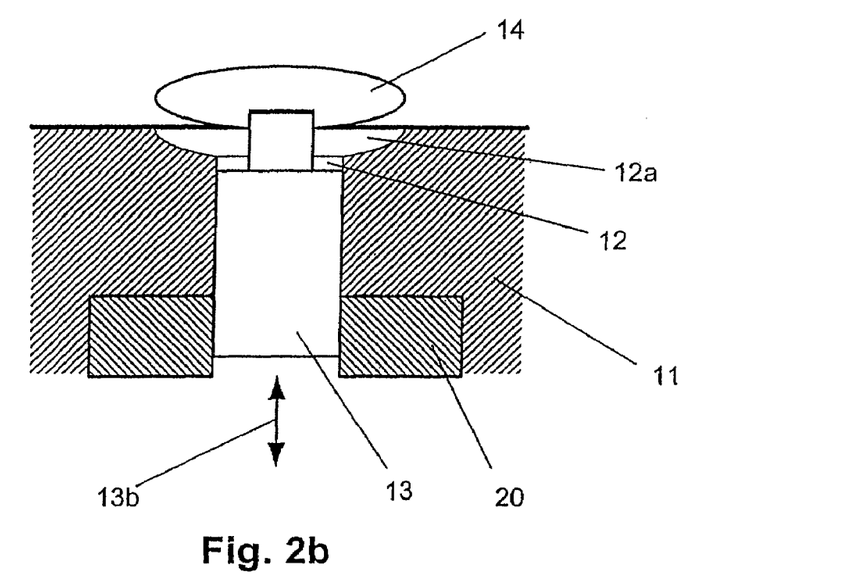
Figure 2C:
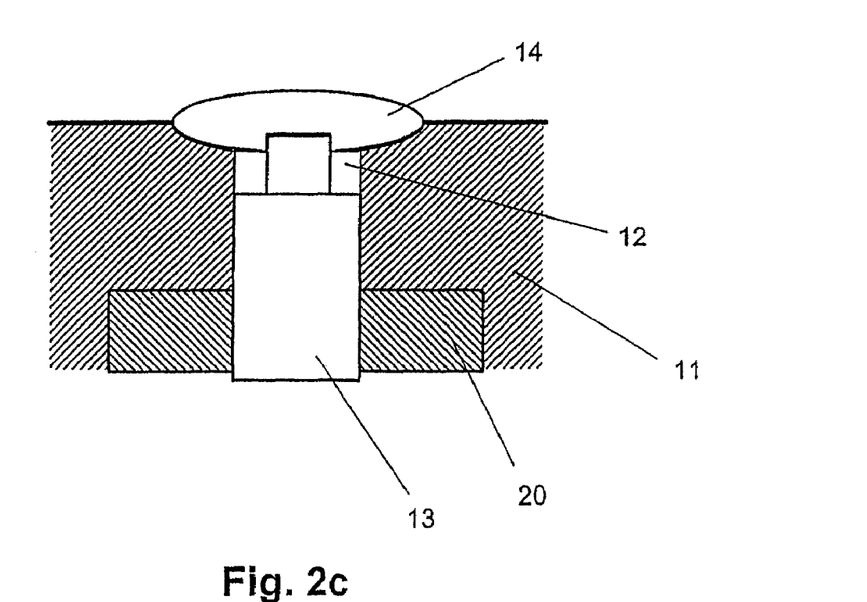

The drawings in FIG. 2a, FIG. 2b and FIG. 2c are sectional views of a device, according to a preferred embodiment of the present invention. The sectional views relate to the same sectional plane, but different states of the device.

FIG. 2a shows the device with an access entitlement unit 14 that has not been inserted into the receptacle yet. In FIG. 2b, the access entitlement unit 14 has been inserted into its receptacle, but the tripping element 13 has not been actuated yet. In FIG. 2c, the access entitlement unit 14 has been inserted into its receptacle; and the tripping element 13 has been actuated.

The underside of the access entitlement unit 14 has a recess 14a, by which the access entitlement unit 14 can be mounted on a receiving pin 13a of the tripping element 13 in the direction of the arrow 14b. Therefore, the receptacle for the access entitlement unit 14 is arranged on the tripping element 13. For a defined fastening of the access entitlement unit 14 to the tripping element 13, there is a detachable snap connection (not illustrated) between the receiving pin 13a and the recess 14a.

The tripping element 13 is mounted in a recess 12 of the center console 11 of a motor vehicle. Therefore, in principle, it can be moved along the recess 12 in the direction of movement indicated by the double arrow 13b. The upper side of the recess 12 terminates in a depression 12a, into which the access entitlement unit 14 may sink to some degree (see FIG. 2c).

To enable this sinking, the depression 12a in the present example is trough-shaped; and its shape is adapted somewhat to the outer shape of the access entitlement unit 14. Furthermore, the trough-shape allows the operator to know by intuition where he has to insert the access entitlement unit 14, which is substantially oval-shaped in the present example. In addition, the matching contours of the tripping element 13 and the access entitlement unit 14 (receiving pin 13a versus recess 14a) offer the operator the possibility of an especially haptic orientation while inserting the access entitlement unit 14 into the suitable position. For example, it prevents the access entitlement unit 14 from being placed crookedly in the trough 12a.

After mounting the access entitlement unit 14 on the tripping element 13, the access entitlement unit can move in only the single existing (translatoric) degree of freedom of the tripping element 13 (see double arrow 13b).

Mounting the access entitlement unit 14 on the tripping element 13 results virtually in a new operating element 13, 14. The operating element can also be moved in principle along the recess 12 in the direction of movement indicated by the double arrow 13b.

The arrows 13b and 14b show in the present example that after mounting (arrow 14b) the access entitlement unit is moved (arrow 13b to the top) further translatorically essentially in the same direction (in this case even exactly in the same direction), in order to actuate the tripping element and to initiate an engine start.

The mounting of the access entitlement unit 14 on the tripping element 13 can be detected on the vehicle side. A Reed switch (not illustrated), the switching signal of which is evaluated by the control of the tripping unit, of which the tripping element 13 is a part, is used to detect the mounting of the access entitlement unit 14 on the tripping element 13.

Furthermore, the tripping unit comprises an actuator 20, which envelops the tripping element 13. The tripping element 13 (or rather the operating element 13, 14) may be limited in its movement in the direction of movement indicated by the double arrow 13b, by way of the actuator 20. In the example described here, the tripping element cannot be moved, thus it is locked, in the direction of movement indicated by the double arrow 13b as long as the access entitlement unit 14 is not mounted on the tripping element 13. As soon as the access entitlement unit 14 is mounted on the tripping element 13, the locking action is initiated. Following the locking action, the operating element 13, 14 can be moved along a force-distance characteristic curve, stored in the control unit of the tripping unit, by pressure exerted from the top by the operator on the access entitlement unit 14. The force-distance characteristics can be adapted to a desired haptic that is felt by the operator.

The operator of the operating element 13, 14 has to push down a few millimeters in order to initiate an engine start. FIG. 2c shows the operating element 13, 14 in the depressed state.

Figure 3:
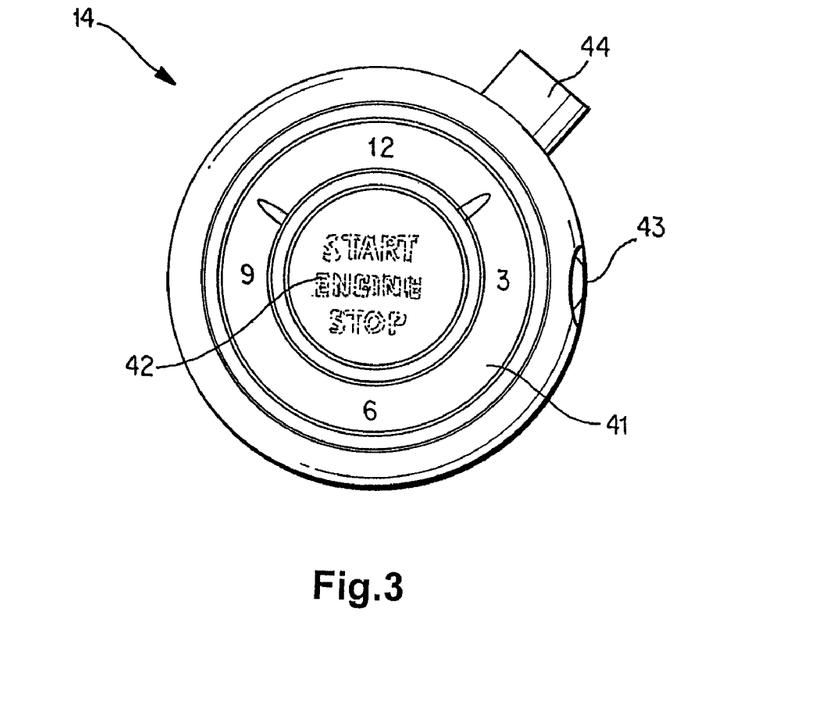
FIG. 3 is a schematic drawing of a preferred embodiment of an access entitlement unit as a component of the device, according to the invention.

The top side of the access entitlement unit 14, which is oval-shaped in the present example, has two display elements. FIG. 3 shows the access entitlement unit 14. The two display elements are constructed as a liquid crystal display 42 and an analog clock 41, wrapped around the liquid crystal display 42. Furthermore, the access entitlement unit 14 exhibits a continuation 44. the continuation 44 facilitates the operator's grasping the access entitlement unit 14 and may act as an antenna.

The analog clock 41 indicates to the operator the current clock time at any time, even outside the motor vehicle. When the access entitlement unit 14 is in the mounted state on the tripping element 13, the analog clock 41 is also in the operator's field of vision. Therefore, there is no need for an additional clock display in the motor vehicle.

The liquid crystal display 42 shows a symbol outside the motor vehicle. This symbol may be designed by the operator with the use of a coupling to a PC (to be described below). In the motor vehicle, the liquid crystal display 42 shows the operator a symbol or text instructing him to mount the access entitlement unit 14 on the tripping element 13. Once the access entitlement unit 14 has been mounted on the tripping element 13, the liquid crystal display 42 shows the operator a symbol or text indicating that the engine may be started or stopped by depressing the operating element 13, 14. The example in FIG. 3 shows the textual instruction: "START ENGINE STOP".

Both display elements 41, 42 are mounted on the access entitlement unit 14 behind a plastic cover. Therefore, the operator may exert pressure over the entire surface of the access entitlement unit 14 without the risk of damaging it. The inventive device, described in the present example, includes a suitable coupling station 50 for coupling the access entitlement unit 14 to a PC and/or another data processing and/or configuration unit.

To produce such a coupling, the access entitlement unit 14 is moved in the vicinity of the coupling station 50 or inserted into the same. In the present example, the coupling station 50 has a holding device, into which the access entitlement unit 14 may be inserted, according to FIG. 4. The coupling station 50 can be supplied with energy via a connecting line 50a and can be connected to a PC. Similarly, the connection to the PC may be produced wirelessly.

Figure 4:
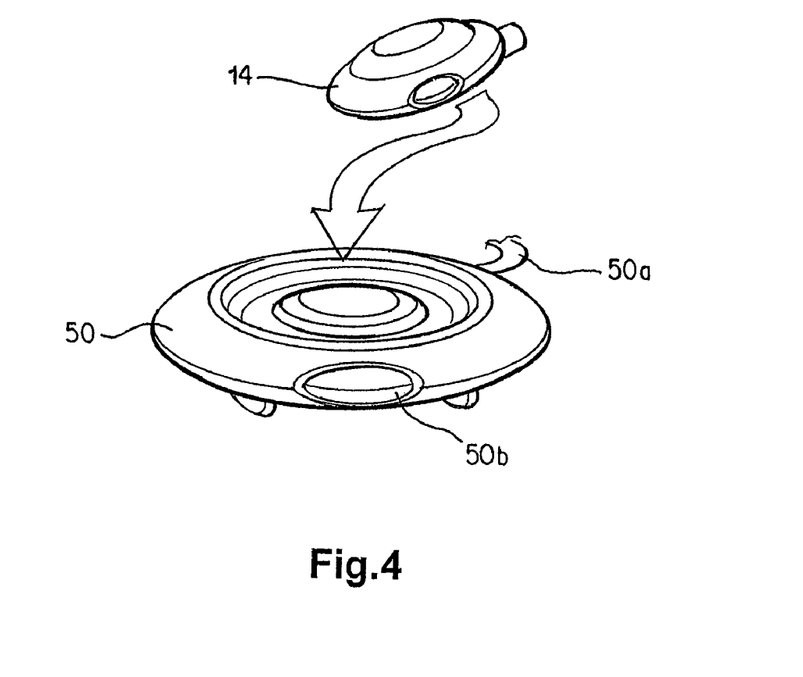
FIG. 4 is a schematic drawing of the same access entitlement unit with a preferred embodiment of a coupling station for such an access entitlement unit.

Both the access entitlement unit 14 and the coupling station 50 exhibit means for wireless communication with each other. For example, the communication between the access entitlement unit 14 and the coupling station 50 may ensue with the use of, for example, infrared or Bluetooth technology. In FIG. 3 and FIG. 4, the required interfaces to the access entitlement unit 14 and the coupling station 50 are indicated by the coupling elements 43 and 50b.

The infrared or Bluetooth interface of the access entitlement unit 14 is also suitable for communication with other coupling stations, in particular inside the motor vehicle.

The access entitlement unit 14 contains a personal data memory (not illustrated). The operator's personal data, stored in this personal data memory, may be configured using a PC via the coupling station 50. Furthermore, personal data can also be transferred from the access entitlement unit to the motor vehicle. The configuration of the tripping unit or other components may be influenced as a function of the personal data. For example, the force-distance characteristics (which have already been discussed) of the operating element 13, 14 may be influenced.

If the operator makes changes to the configuration while operating the motor vehicle, the correspondingly changed configuration of the motor vehicle may also be received in the form of personal data in the personal data memory of the access entitlement unit 14. For example, a corresponding data transfer may take place while stopping the engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A device for starting an engine of a motor vehicle, comprising:
    an access entitlement unit, substantially oval shaped as a starter button, which is portable for carrying by a vehicle driver, the access entitlement unit including at least one optical display element;
    a vehicle-side access entitlement test device having a receptacle for receiving the access entitlement unit, the recessed receptacle having a shape complementary to the shape of the acess entitlement unit;
    a tripping unit comprising a tripping element which, when activated, initiates an engine start of the motor vehicle, the tripping element being actuated against a mechanical resistance generating an active force;
    wherein the tripping element and the receptacle are coupled mechanically together such that the tripping element is actuatable by translating the access entitlement unit when inserted into the recessed receptacle in a direction of insertion, in a manner analogous to operation of the starter button; and
    wherein the optical display element is oriented towards the vehicle driver on the access entitlement unit, when the access entitlement unit is inserted into the recessed receptacle, to provide the vehicle driver with a visual indication the motor vehicle is ready to initiate the engine start.

2. The device according to claim 1, further comprising means for detecting a presence of the access entitlement unit in the receptacle.

3. The device according to claim 2, wherein the tripping element is actuatable only after the access entitlement unit is present in the receptacle and corresponding access entitlement test has been successfully completed.

4. The device according to claim 1, wherein the tripping element is actuatable only after the access entitlement unit is present in the receptacle and a corresponding access entitlement test has been successfully completed.

5. The device according to claim 4, wherein the tripping element is constructed to be mechanically lockable.

6. The device according to claim 1, wherein the tripping element is constructed to be mechanically lockable.

7. The device according to claim 1, further comprising a memory in the access entitlement unit, wherein personal data of the user is storable in the access entitlement unit and transferable from the access entitlement unit to the motor vehicle.

8. The device according to claim 1, wherein personal data of the user is storable in the access entitlement unit and transferable from the access entitlement unit to the motor vehicle; and further comprising an actuator for applying the mechanical resistance, against which the actuation of the tripping element takes place, is adapted as a function of the personal data stored in the access entitlement unit.

9. The device according to claim 1, wherein vehicle data is transferable from the motor vehicle to the access entitlement unit; and
wherein the at least one optical display element serves to display the vehicle data while using the vehicle.

10. The device according to claim 1, further comprising a cover for protecting the optical display element from pressure applied when actuating the tripping element.

11. A method for starting an engine of a motor vehicle using an authentication device, which comprises a portable access entitlement unit substantially oval shaped as a starter button, having an optical dispaly and a vehicle-side access entitlement test device having a reccessed receptacle for the portable access entitlement unit, the reccessed receptacle having a shape complementary to the shape of the access entitlement unit, and a tripping unit, which includes a tripping element that, when activated, initiates an engine start, the method comprising the acts of:
inserting the access entitlement unit into the reccessed receptacle of the vehicle-side access entitlement test device in a translation movement; in a manner analogous to operation of the starter button;
displaying on the optical display of the access entitlement unit a visual indicator that the engine start is initiable, the optical display being oriented towards a vehicle driver when the access entitlement unit is inserted into the recessed receptacle; and
continuing the translation movement of the access entitlement unit, in a direction of insertion, including the optical display, in the recessed receptacle to actuate the tripping element of the tripping unit against a mechanical resistance generating an active force, to initiate the engine start.

12. A method for starting an engine of a motor vehicle using an authentication device, which comprisesa potable access entitlement and a vehicle-side access entitlement test device having a receptacle for the portable access entitlement unit, and a tripping unit, which includes a tripping element that, whe activated, initiates an engine satrt, the method comprising acts of:
inserting the access entitlement unit inot the receptacle of the vehicle-side access entitlement test device in a transaltion movement;
continuing the translation movement of the access entitlement unit in the receptacle, in a direction of insertion, to actuate the tripping element of the tripping unit; and
varying a mechanical resistance of the tripping element that acts against the continuing translation movement to generate a desired haptic feedback as a function of characteristics of a user of the access entitlement unit.

13. A device for starting an engine of motor vehicle, comprising:
an access entitlement unit which is portable for carrying by a vehicle driver, the access entitlement unit including at least one optical dispaly element;
a vehicle-side access entitlement test drive having a receptacle for receiving the access entitlement unit;
a tripping unit comprising a tripping element which, when activated, initiates an engine start of the motor vehicle;
wherein the tripping element and the receptacle are coupled mechanically together such that the tripping element is actuatable by translating the access entitlement unit when inserted into the receptacle in a direction of insertion, the tripping element transmitting an active force to the inserted access entitlement unit to resist transaltion thereof and to generate a desired haptic feedback, as a function of personal data of the access entitlement unit; and
wherein the optical display element is operatively configured on the access entitlement unit to provide a vehicle driver with an indication the motor vehicle is ready to initiatethe engine start.

* * * * *